United States Patent
Nathan et al.

(10) Patent No.: US 12,310,519 B1
(45) Date of Patent: May 27, 2025

(54) MODULAR CULINARY IMPLEMENT STORAGE SYSTEM

(71) Applicant: Caraway Home, Inc., New York, NY (US)

(72) Inventors: Jordan Nathan, New York, NY (US); Bret Recor, San Francisco, CA (US); Christoph Andrejcic, San Francisco, CA (US); Sehee Ahn, San Francisco, CA (US); Kenneth Young, San Francisco, CA (US); Benjamin Gross, San Francisco, CA (US)

(73) Assignee: Caraway Home, Inc., New York, NY (US)

( * ) Notice: Subject to any disclaimer, the term of this patent is extended or adjusted under 35 U.S.C. 154(b) by 0 days.

(21) Appl. No.: 18/232,809

(22) Filed: Aug. 10, 2023

(51) Int. Cl.
A47G 21/14 (2006.01)

(52) U.S. Cl.
CPC .......... *A47G 21/14* (2013.01); *A47G 2200/10* (2013.01)

(58) Field of Classification Search
CPC ...... A47G 21/14; A47G 21/145; A47G 21/00; A47G 2200/10
See application file for complete search history.

(56) References Cited

U.S. PATENT DOCUMENTS

| | | | | |
|---|---|---|---|---|
| 5,361,915 A | * | 11/1994 | Cohen | A47G 21/14 248/37.3 |
| 5,377,850 A | * | 1/1995 | Liaw | B43M 99/008 211/11 |
| 5,775,518 A | * | 7/1998 | Connor | A47G 21/14 248/37.3 |
| 5,850,784 A | * | 12/1998 | Conner | A47J 47/005 248/37.3 |
| 11,272,829 B2 | * | 3/2022 | Klug | F26B 9/003 |
| 2011/0120906 A1 | * | 5/2011 | Umholtz | A47B 88/90 206/557 |
| 2016/0068325 A1 | * | 3/2016 | Prommel | A47J 47/005 206/576 |

* cited by examiner

*Primary Examiner* — Nkeisha Smith
(74) *Attorney, Agent, or Firm* — Bochner PLLC; Andrew D Bochner; Eric R Kleinertz (57) ABSTRACT

A modular culinary storage system comprising a tray; a utensil bucket; a utensil block; and a knife block. The utensil block comprises a plurality of utensil block top surface apertures and a plurality of utensil block storage compartments. The knife block comprises a first front end member comprising a first front end member top surface notch; a second front end member, comprising a second front end member top surface notch, the first front end member top surface notch and the second front end member top surface notch defining a front end aperture; a plurality of elongated members; a back-end member; and a plurality of dividers disposed between at least one of the first front end member, the second front end member, the plurality of elongated members, and the back-end member. The tray is configured to house at least one of the utensil bucket, the utensil block, and the knife block.

15 Claims, 10 Drawing Sheets

MODULAR CULINARY IMPLEMENT STORAGE SYSTEM

FIELD OF THE INVENTION

The present invention is directed to a modular culinary implement storage system. More specifically, the present invention is directed to a modular culinary implement storage system facilitating economical utilization of space and improved storage capabilities.

INTRODUCTION

Contemporary kitchens often include a plethora of apparatuses ("cooking implements") used for the preparation of cooked goods. Due to the variety of cooking implements utilized in the preparation of cooked goods, ensuring said implements are easily accessible is of paramount importance.

Resulting from the ceaseless usage of cooking implements in a person's everyday life, the varied layouts of kitchens in different homes, and the need for easily accessible cooking implements, a variety of cooking implement storage systems have been attempted.

Conventional cooking implement storage systems attempt to store implements in a manner that increases accessibility and decreases required space. In situations where kitchen space is limited, such as apartments in urban environments, economical utilization of kitchen space is particularly desirable. However, even with the reduction in space, conventional cooking implement storage systems are seldom efficient. Traditionally, cooking implement storage systems are a cylindrical shaped bucket, or a drawer where cooking implements are haphazardly grouped together. Furthermore, the incongruous shapes of various cooking implements thrown into a bucket or placed in a drawer, forces cooks to waste time searching for a specific implement while cooking. Essentially, traditional storage systems in conjunction with the incongruity of cooking implements, has forced cooks to economize their kitchens at the expense of maximizing efficiency.

Additionally, the segregation of cooking implements exacerbated by traditional storage systems has further increased inefficiency in the kitchen. For example, a cook must grab a knife from a countertop knife block to chop vegetables, and then retrieve a spoon from a drawer to stir ingredients cooking in a pot. The separation of various cooking implements has engendered increased inefficiency for cooks in the kitchen.

Thus, it would be desirable to provide systems and devices that maximize both the economy of space and efficiency in the kitchen. It would be further desirable to provide systems and devices allowing cooks to customize the arrangement of storage systems to best suit their needs.

Systems and devices for storing cooking implements that are modular, customizable, efficient, and modest in scale, in order to be adapted to various kitchen sizes and countertop arrangements, prove advantageous to cooks over the employment of traditional storage systems.

Therefore, systems and devices incorporating such advantageous features are hereby provided.

SUMMARY

This Summary is provided to introduce a selection of concepts in a simplified form that are further described below in the Detailed Description. This Summary is not intended to identify key features or essential features, nor is it intended to limit the scope of the claims included herewith.

Provided may be a modular culinary storage system comprising: a tray; a utensil bucket; a utensil block comprising: a utensil block top surface comprising a plurality of utensil block top surface apertures, and a plurality of utensil block storage compartments, each of the plurality of utensil block storage compartments bound by at least one of the plurality of utensil block top surface apertures; and a knife block comprising: a first front end member comprising a first front end member top surface notch; a second front end member, comprising a second front end member top surface notch, the first front end member top surface notch and the second front end member top surface notch defining a front end aperture; a plurality of elongated members; a back-end member; and a plurality of dividers disposed between at least one of the first front end member, the second front end member, the plurality of elongated members, and the back-end member; the tray, configured to house at least one of the utensil bucket, the utensil block, and the knife block; and the utensil bucket, configured to house at least one of the utensil block and the knife block.

In an embodiment, the tray further comprises one or more magnetic tray members. In a further embodiment, the utensil bucket further comprises one or more magnetic utensil bucket members. In another embodiment, the utensil block further comprises one or more magnetic utensil block members. In yet a further embodiment, the knife block further comprises one or more magnetic knife block members.

In an embodiment, each of the plurality of dividers comprise a divider base; a divider front wall orthogonal to the divider base; and a divider back wall orthogonal to the divider base. The divider front wall may be shorter than the divider back wall.

In an embodiment, the utensil block further comprises a plurality of utensil block storage compartments, each of the plurality of utensil block storage compartments bound by one of a utensil block bottom surface apertures and one of the utensil block top surface apertures. The tray may further comprise a foot not traversing the entirety of the tray.

In an embodiment, the plurality of dividers define a plurality of knife block compartments.

In an embodiment, each of the plurality of knife block compartments further comprises at least one knife block compartment opening, wherein each of the at least one knife block compartment openings is of a lesser area than the front end aperture. The utensil bucket may be sized to accept the utensil block, and the utensil block may be configurable in a plurality of configurations within utensil bucket. The plurality of configurations may comprise a first configuration and a second configuration, wherein the utensil bucket may comprise a bucket front wall, a bucket back wall, a bucket first wall, and a bucket second wall, in the first configuration, the utensil block may interface only with the bucket front wall, the bucket back wall, and the bucket first wall, and, in the second configuration, the utensil block may interface only with the bucket front wall, the bucket back wall, and the bucket second wall. The plurality of configurations may further comprise a third configuration, and, in the third configuration, the utensil block may interface only with the bucket front wall and the bucket back wall.

Each of the plurality of utensil block top surface apertures may be oblong, wherein the utensil bucket may comprise a utensil bucket sidewall, and each of the plurality of utensil block top surface apertures may be disposed nonorthogonal to the utensil bucket sidewall. In an embodiment, the utensil block comprises a utensil block side wall, and wherein the utensil bucket sidewall and the utensil block sidewall comprise complementary curvature.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Disclosed herein are systems and devices for culinary utensil storage (the "system"). In an embodiment, the system provides a space-saving benefit. In another embodiment, the system provides a customizable solution for storing various culinary implements. Further disclosed is a novel system and device that avoids the need for haphazard culinary implement storage, which is inefficient, time consuming, and leads to frustration. Additionally, such a system may increase the aesthetic appearance of a kitchen.

In an embodiment, the invention of the present disclosure is a modular culinary implement storage system (the "storage system"). The storage system may be configured to store a cook's culinary implements without the need for indiscriminate placement of said implements in a drawer.

Figure 1:
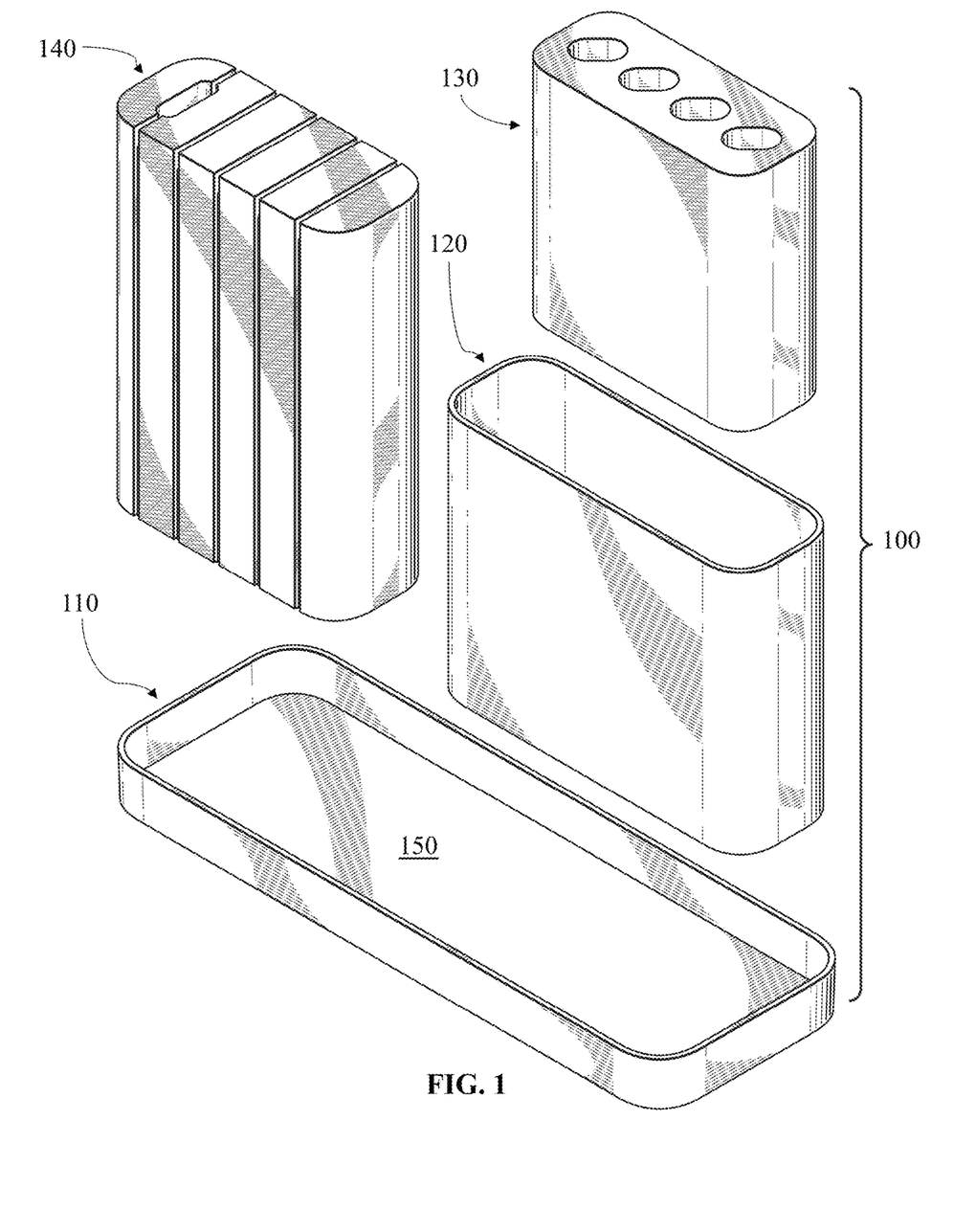
FIG. 1 is an illustration of an embodiment of an exploded view of the culinary implement storage system.

Referring to FIG. 1, the storage system comprises a plurality of components, wherein said components may be at least one of a tray 110, a utensil bucket 120, a utensil block 130, and a knife block 140. Said components may be modular, wherein the modularity allows for the cook to customize the storage system into a plurality of configurations. In an embodiment, the plurality of configurations may provide increased cooking efficiency. In another embodiment, the plurality of configurations may allow for the cook to reduce needed storage space. As a non-limiting example, the storage system and components thereof (e.g., tray 110, utensil bucket 120, utensil block 130, and knife block 140) may be readily convertible to various configurations. Accordingly, the storage system may be adapted such that a user may modify the configuration ad hoc.

The components of the storage system may be modular in the sense that there are a number of components (e.g., tray 110, utensil bucket 120, utensil block 130, and knife block 140) that may be used in conjunction with one another or may be utilized separately. In one configuration, the knife block 140 may stand alone or may be laid flat in a drawer or other receptacle. As described in more detail below, the vertical cuts on the knife block 140 may be sized such that the knife block 140 may be laid in a drawer flat and the knives may be extracted in such a position. In one configuration, the utensil bucket 120 may be separated from the other storage system components and may be utilized as a storage bucket within a user's home or kitchen. In one configuration, the tray, may be separated from the other storage system components and may be utilized as a storage tray within a user's home or kitchen. In one configuration, the tray 110 may be utilized in conjunction with solely the bucket, while the knife block 140 is placed in a drawer. In one configuration, the tray 110 may be placed with the knife block 140 and the utensil bucket 120 may be placed somewhere else within the user's home.

In an embodiment, the tray 110 may be composed of aluminum with a silicone foot (e.g., the aluminum may be powder coated in color). In an embodiment, the utensil bucket 120 may be composed of aluminum with a silicone foot (e.g., the aluminum may be powder coated in color). In an embodiment, the knife block 140 may be composed of wood with a silicone foot. In an embodiment, the utensil block 130 may be composed of wood. In an embodiment, the utensil bucket 120 and/or the tray 110 may be composed of stainless steel (or any other type of metal), MDF with fabric, plastic, silicone, TPR, glass, and/or stone. In an embodiment, the utensil block 130 and/or the knife block 140 may be composed of stainless steel (or any other type of metal), MDF with fabric, and/or plastic. However, any of the aforementioned components may be composed of any suitable combination of materials.

In an embodiment, the utensil bucket 120 and/or the tray 110 may include a colored powder coating on the exterior. The knife block 140 and the utensil block 130 may include a lacquer natural varnish. In various embodiments, based on the substrate material, any surface finish, coating, color, texture may be used to change the aesthetic or performance.

Figure 2A:
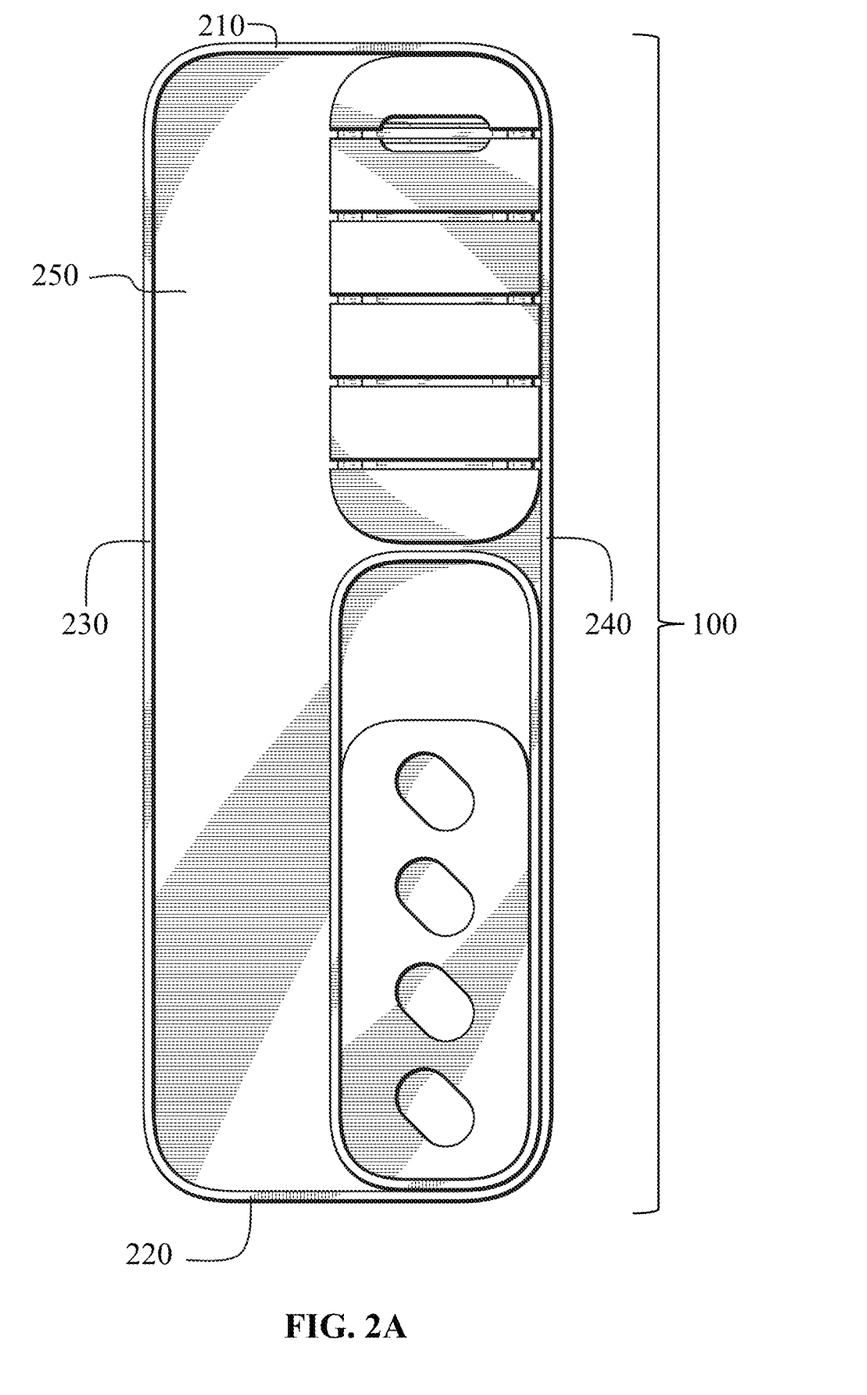
FIG. 2A is an illustration of an embodiment of the culinary implement storage system, wherein the utensil block is in a third configuration.
Figure 2B:
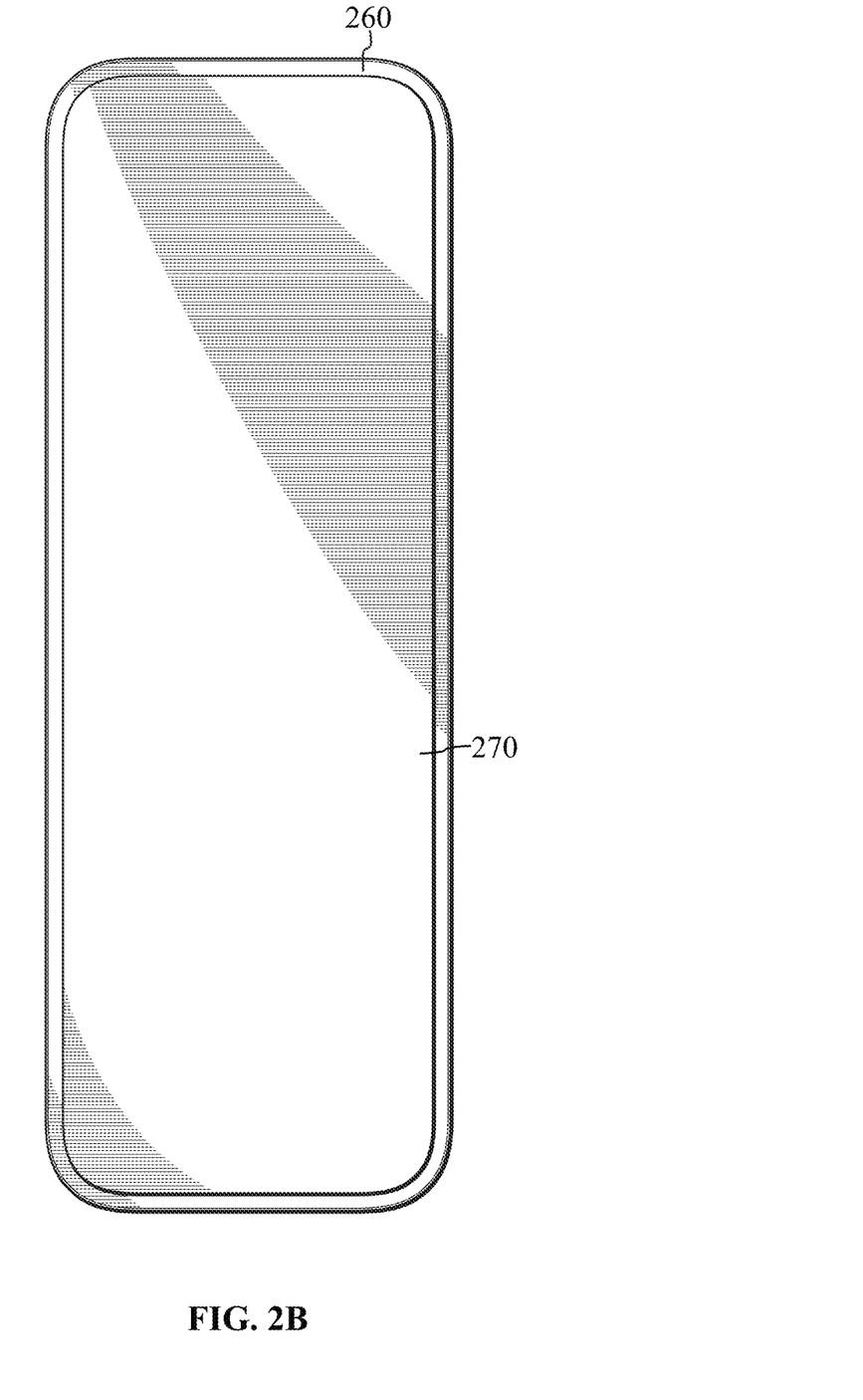
FIG. 2B is an illustration of an embodiment of the tray base bottom surface.

Referring to FIGS. 2A and 2B, the plurality of components comprising the storage system may include the tray 110, wherein said tray 110 may be comprised of a tray base 150, a tray first sidewall 230, a tray second sidewall 240, a tray front wall 210, and/or a tray back wall 220. The tray 110 may be comprised of a tray material, wherein said material may include at least one of ceramic, glass, metal, plastic, and wood. In an embodiment, the tray 110 may be comprised of one or more of the aforementioned tray materials.

In an embodiment, the tray base 150 may be comprised of a tray base top surface 250 and a tray base bottom surface 260. Moreover, the tray base 150 may be configured into a tray base shape, wherein the tray base shape is at least one of a rectangle, a square, an ellipse, a circle and a chamfered rectangle. However, the tray base shape may be comprised of any suitable shape alternative.

In an embodiment, the tray base top surface 250 may employ one or more magnets. In another embodiment, ferrous material may be disposed within the tray base top surface 250. Accordingly, other system components (e.g., utensil bucket 120, utensil block 130, and knife block 140) comprising magnetics, metallic material, or magnetic material may be reversibly adhered to the tray base top surface 250. In an embodiment, the tray 110 includes a carbon steel sheet on the underside (e.g., underneath the silicone foot pad), for example, to allow for the knife block 140 to magnetically attach. As a non-limiting example, the knife block 140 itself may include a plurality of magnets (e.g., N52 magnets) on the bottom, for example, also underneath the silicone foot pad. However, in various embodiments, any suitable magnets may be utilized. As a non-limiting example, carbon steel and 12 N52 magnets may be used between the tray 110 and the knife block 140. Any of the component contemplated herein may be reversibly affixed by any number or type of magnet or metallic component. In another embodiment, any of components (e.g., tray 110, utensil bucket 120, utensil block 130, and knife block 140) may be reversibly affixed with any suitable fastening mechanisms, including, but not limited to, hook-and-loop fasteners.

The tray front wall 210 may have a tray front wall bottom edge, a tray front wall top edge, a tray front wall inner surface, and/or a tray front wall outer surface. The tray front wall 210 may be disposed on a front edge of the tray base. Moreover, the tray front wall 210 may be disposed between the tray base top surface 250 and the tray base bottom surface 260 along the front edge of the tray base, wherein the disposition of the tray front wall 210 defines a bottom lip of the tray base. In a different embodiment, the tray front wall bottom edge is configured to be flush with the tray base bottom surface 260. In a further embodiment, the tray front wall bottom edge is configured to be flush with the tray base top surface 250. In yet a further embodiment, a tray front wall width, extending along a first axis, may exceed a tray front wall length, extending along a second axis. Furthermore, the tray front wall length may exceed the tray front wall width.

The tray front wall bottom edge may be disposed between the tray front wall inner surface and the tray front wall outer surface. In another embodiment, the tray front wall top edge may be disposed between the tray front wall inner surface and the tray front wall outer surface. In a further embodiment, the tray front wall top edge may be disposed between a tray front wall inner surface top edge and a tray front wall outer surface top edge, and the tray front wall bottom edge may be disposed between a tray front wall inner surface bottom edge and a tray front wall outer surface bottom edge.

The tray back wall 220 may have a tray back wall bottom edge, a tray back wall top edge, a tray back wall inner surface, and/or a tray back wall outer surface. The tray back wall 220 may be disposed on a back edge of the tray base. Said tray back wall 220 may be disposed between the tray base top surface 250 and the tray base bottom surface 260 on the back edge of the tray base, wherein the disposition of the tray back wall 220 further defines the bottom lip of the tray base. In another embodiment, the tray back wall bottom edge is configured to be flush with the tray base bottom surface 260. In an embodiment, the tray back wall bottom edge is configured to be flush with the tray base top surface 250. In a different embodiment, a tray back wall width, extending along the first axis, may exceed a tray back wall length, extending along the second axis. Furthermore, the tray back wall length may exceed the tray back wall width.

The tray back wall bottom edge may be disposed between the tray back wall inner surface and the tray back wall outer surface. In another embodiment, the tray back wall top edge may be disposed between the tray back wall inner surface and the tray back wall outer surface. In a different embodiment, the tray back wall top edge may be disposed between a tray back wall inner surface top edge and a tray back wall outer surface top edge, and the tray back wall bottom edge may be disposed between a tray back wall inner surface bottom edge and a tray back wall outer surface bottom edge.

The tray first sidewall 230 may have a tray first sidewall bottom edge, a tray first sidewall top edge, a tray first sidewall inner surface, and/or a tray first sidewall outer surface. The tray first sidewall 230 may be disposed between the tray front wall 210 and the tray back wall 220 along a first edge of the tray base. Furthermore, the tray first sidewall 230 may be disposed between the tray base top surface 250 and the tray base bottom surface 260 along said first side edge of the tray base, wherein the disposition of the tray first sidewall 230 further defines the bottom lip of the tray base. In an embodiment, the tray first sidewall 230 is positioned such that the tray first sidewall bottom edge is flush with the tray base bottom surface 260. In another embodiment, the tray first sidewall 230 is positioned such that the tray first sidewall bottom edge is flush with the tray base top surface 250. In a further embodiment, a tray first sidewall width, extending along the first axis, may exceed a tray first sidewall length, extending along the second axis. Additionally, the tray first sidewall length may exceed the tray first sidewall width.

The tray first sidewall bottom edge may be disposed between the tray first sidewall inner surface and the tray first sidewall outer surface. In another embodiment, the tray first sidewall top edge may be disposed between the tray first sidewall inner surface and the tray first sidewall outer surface. In a further embodiment, the tray first sidewall top edge may be disposed between a tray first sidewall inner surface top edge and a tray first sidewall outer surface top edge, and the tray first sidewall bottom edge may be disposed between a tray first sidewall inner surface bottom edge and a tray first sidewall outer surface bottom edge.

The tray second sidewall 240 may have a tray second sidewall bottom edge, a tray second sidewall top edge, a tray second sidewall inner surface, and/or a tray second sidewall outer surface. The tray second sidewall 240 may be disposed between the tray front wall 210 and the tray back wall 220 along a second edge of the tray base. Additionally, the tray second sidewall 240 may be disposed between the tray base top surface 250 and the tray base bottom surface 260 along the second edge of the tray base, wherein the disposition of the tray second sidewall 240 further defines the bottom lip of the tray base. In a further embodiment, the tray second sidewall 240 is positioned such that the tray second sidewall bottom edge is flush with the tray base bottom surface 260. In another embodiment, the tray second sidewall 240 is positioned such that the tray second sidewall bottom edge is flush with the tray base top surface 250. In an embodiment, a tray second sidewall width, extending along the first axis, may exceed a tray second sidewall length, extending along the second axis. Moreover, the tray second sidewall length may exceed the tray second sidewall width.

The tray second sidewall bottom edge may be disposed between the tray second sidewall inner surface and the tray second sidewall outer surface. In another embodiment, the tray second sidewall top edge may be disposed between the tray second sidewall inner surface and the tray second sidewall outer surface. In a further embodiment, the tray second sidewall top edge may be disposed between a tray second sidewall inner surface top edge and a tray second sidewall outer surface top edge, and the tray second sidewall bottom edge may be disposed between a tray second sidewall inner surface bottom edge and a tray second sidewall outer surface bottom edge.

The tray first sidewall 230, the tray second sidewall 240, the tray front wall 210, and the tray back wall 220 may define a congruous tray rim. In an embodiment, the tray first sidewall inner surface, the tray second sidewall inner surface, the tray front wall inner surface, and the tray back wall inner surface may define a congruous tray rim inner surface. In another embodiment, a tray storage area may be defined by the congruous tray rim inner surface and the tray base top surface 250. The congruous tray rim may comprise a height suitable to prevent any of the system components (e.g., tray 110, utensil bucket 120, utensil block 130, and knife block 140) from inadvertently slipping from the tray storage area. Accordingly, the congruous tray rim may be of a height sufficient to contain such components during regular use yet allow such components to be easily removed from the tray by a user.

The tray storage area may be configured to house at least one of the utensil bucket 120, the utensil block, and the knife block 140. In another embodiment, the tray storage area may be configured to house at least one culinary implement. In a further embodiment, the tray storage area may be configured to house a combination of the utensil bucket 120, the utensil block, the knife block 140, and the at least one culinary implement. In an embodiment, the tray 110 includes a foot 270 disposed on the tray base bottom surface 260. The foot 270 may traverse the entirety of the tray base bottom surface 260. However, in another embodiment, the foot 270 may traverse a portion of the tray base bottom surface 260, such that a perimeter of the tray base bottom surface 260 may be exposed, as shown in FIG. 2B. Accordingly, in such an embodiment, the foot 270 may promote adherence of the tray 110 to its receiving surface, while being generally invisible to an outside viewpoint. The foot 270 may be of a rubber material or any other material suitable to promote reversible adherence between the tray 110 and a receiving surface.

Figure 3:
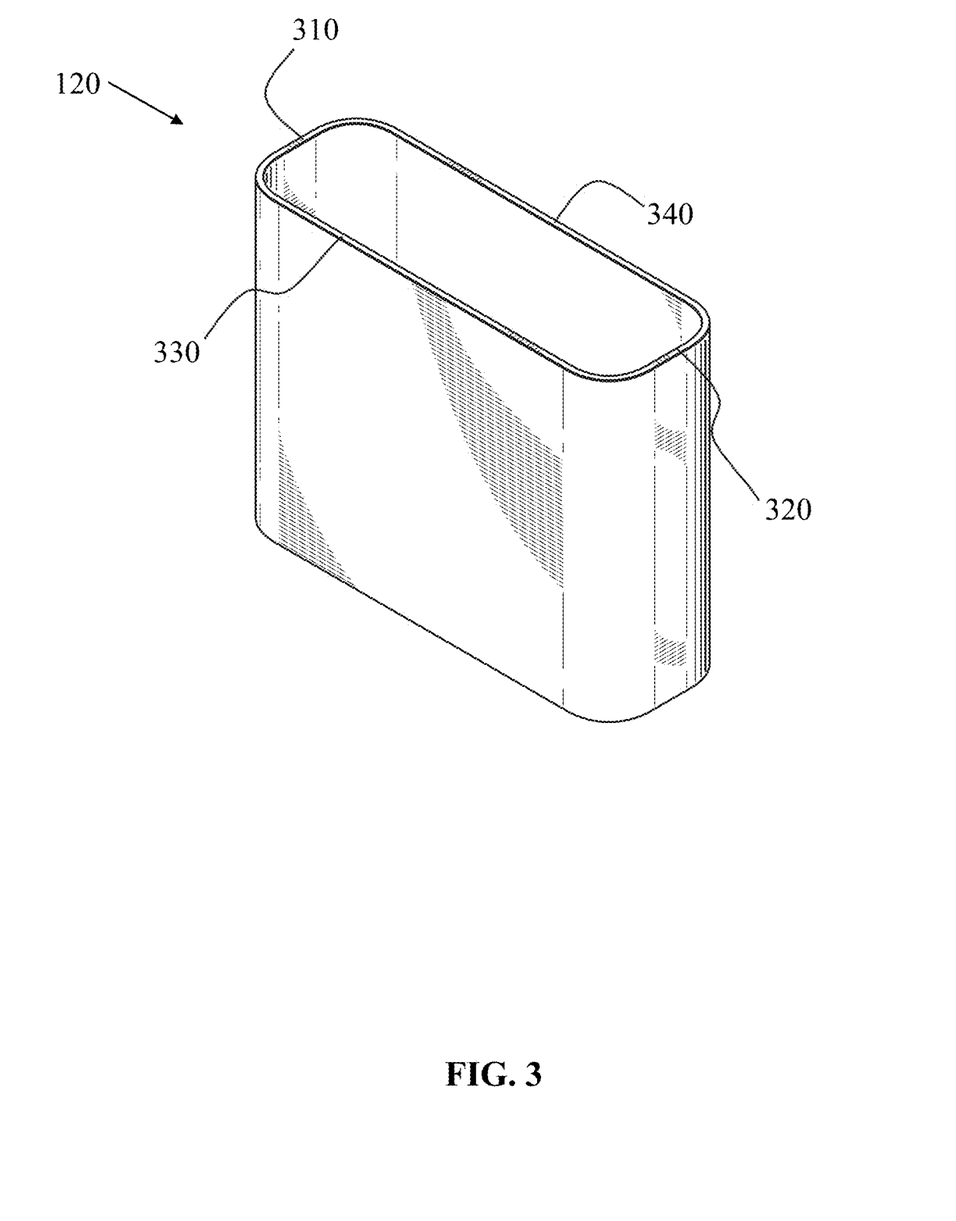
FIG. 3 is an illustration of an embodiment of the utensil bucket.

Referring to FIG. 3, the plurality of components, comprising the storage system, may further include the utensil bucket 120. Said utensil bucket 120 may be comprised of a bucket base, a bucket front wall 310, a bucket back wall 320, a bucket first sidewall 330, and/or a bucket second sidewall 340. The bucket front wall 310, the bucket back wall 320, the bucket first sidewall 330, and/or the bucket second sidewall 340 may form a bucket sidewall. In an embodiment, the bucket base may be comprised of a bucket base top surface and a bucket base bottom surface. The utensil bucket 120 may be comprised of a bucket material, wherein said material may include at least one of ceramic, glass, metal, plastic, and wood. In an embodiment, the utensil bucket 120 may be comprised of one or more of the aforementioned bucket materials.

Figure 9:
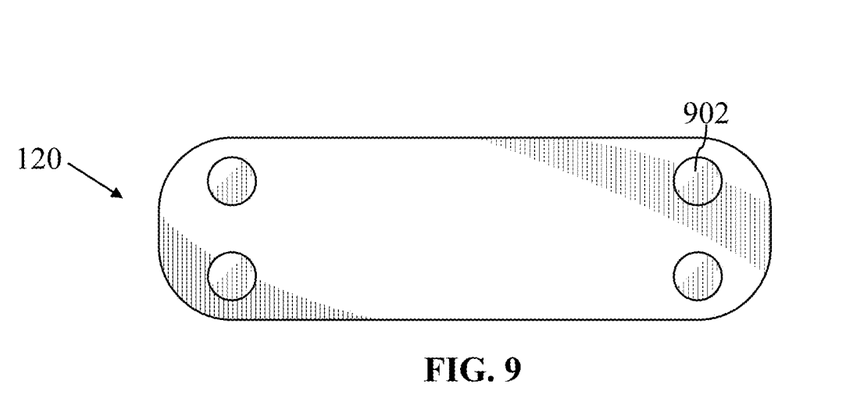
FIG. 9 is an illustration of an embodiment the bottom surface of the utensil bucket.

In an embodiment, the bucket base top surface may employ one or more magnets. In another embodiment, ferrous material may be disposed within the bucket base top surface. In a further embodiment, the bucket base bottom surface may employ one or more magnets 902, such that the bucket base bottom is able to reversibly adhere to the tray base top surface 250. In yet a further embodiment, ferrous material may be disposed within the bucket base bottom surface, such that the bucket base bottom surface is able to reversibly adhere to the tray base top surface 250. Accordingly, the bucket base top surface and/or the bucket base bottom surface may include magnetic or metallic material, allowing magnetic adherence of the bucket 120 to the tray 110 and/or the utensil block 130.

The bucket front wall 310 may have a bucket front wall bottom edge, a bucket front wall top edge, a bucket front wall inner surface, and/or a bucket front wall outer surface. The bucket front wall 310 may be disposed on a front edge of the bucket base. Moreover, the bucket front wall 310 may be disposed between the bucket base top surface and the bucket base bottom surface along the front edge of the bucket base, wherein the disposition of the bucket front wall 310 defines a bottom lip of the bucket base. In a different embodiment, the bucket front wall bottom edge is configured to be flush with the bucket base bottom surface. In a further embodiment, the bucket front wall bottom edge is configured to be flush with the bucket base top surface. In yet a further embodiment, a bucket front wall width, extending along the first axis, may exceed a bucket front wall length, extending along the second axis. Furthermore, the bucket front wall length may exceed the bucket front wall width.

The bucket front wall bottom edge may be disposed between the bucket front wall inner surface and the bucket front wall outer surface. In another embodiment, the bucket front wall top edge may be disposed between the bucket front wall inner surface and the bucket front wall outer surface. In a further embodiment, the bucket front wall top edge may be disposed between a bucket front wall inner surface top edge and a bucket front wall outer surface top edge, and the bucket front wall bottom edge may be disposed between a bucket front wall inner surface bottom edge and a bucket front wall outer surface bottom edge.

The bucket back wall 320 may have a bucket back wall bottom edge, a bucket back wall top edge, a bucket back wall inner surface, and/or a bucket back wall outer surface. The bucket back wall 320 may be disposed on a back edge of the bucket base. Said bucket back wall 320 may be disposed between the bucket base top surface and the bucket base bottom surface on the back edge of the bucket base, wherein the disposition of the bucket back wall 320 further defines the bottom lip of the bucket base. In another embodiment, the bucket back wall bottom edge is configured to be flush with the bucket base bottom surface. In an embodiment, the bucket back wall bottom edge is configured to be flush with the bucket base top surface. In a different embodiment, a bucket back wall width, extending along the first axis, may exceed a bucket back wall length, extending along the second axis. Furthermore, the bucket back wall length may exceed the bucket back wall width.

The bucket back wall bottom edge may be disposed between the bucket back wall inner surface and the bucket back wall outer surface. In another embodiment, the bucket back wall top edge may be disposed between the bucket back wall inner surface and the bucket back wall outer surface. In a further embodiment, the bucket back wall top edge may be disposed between a bucket back wall inner surface top edge and a bucket back wall outer surface top edge, and the bucket back wall bottom edge may be disposed between a bucket back wall inner surface bottom edge and a bucket back wall outer surface bottom edge.

The bucket first sidewall 330 may have a bucket first sidewall bottom edge, a bucket first sidewall top edge, a bucket first sidewall inner surface, and/or a bucket first sidewall outer surface. The bucket first sidewall 330 may be disposed between the bucket front wall 310 and the bucket back wall 320 along a first edge of the bucket base. Furthermore, the bucket first sidewall 330 may be disposed between the bucket base top surface and the bucket base bottom surface along said first edge of the bucket base, wherein the disposition of the bucket first sidewall 330 further defines the bottom lip of the bucket base. In an embodiment, the bucket first sidewall 330 is positioned such that the bucket first sidewall bottom edge is flush with the bucket base bottom surface. In another embodiment, the bucket first sidewall 330 is positioned such that the bucket first sidewall bottom edge is flush with the bucket base top surface. In a further embodiment, a bucket first sidewall width, extending along the first axis may, exceed a bucket first sidewall length, extending along the second axis. Additionally, the bucket first sidewall length may exceed the bucket first sidewall width.

The bucket first sidewall bottom edge may be disposed between the bucket first sidewall inner surface and the bucket first sidewall outer surface. In another embodiment, the bucket first sidewall top edge may be disposed between the bucket first sidewall inner surface and the bucket first sidewall outer surface. In a further embodiment, the bucket first sidewall top edge may be disposed between a bucket first sidewall inner surface top edge and a bucket first sidewall outer surface top edge, and the bucket first sidewall bottom edge may be disposed between a bucket first sidewall inner surface bottom edge and a bucket first sidewall outer surface bottom edge.

The bucket second sidewall 340 may have a bucket second sidewall bottom edge, a bucket second sidewall top edge, a bucket second sidewall inner surface, and/or a bucket second sidewall outer surface. The bucket second sidewall 340 may be disposed between the bucket front wall 310 and the bucket back wall 320 along a second edge of the bucket base. Additionally, the bucket second sidewall 340 may be disposed between the bucket base top surface and the bucket base bottom surface along the second edge of the bucket base, wherein the disposition of the bucket second sidewall 340 further defines the bottom lip of the bucket base. In a further embodiment, the bucket second sidewall 340 is positioned such that the bucket second sidewall bottom edge is flush with the bucket base bottom surface. In another embodiment, the bucket second sidewall 340 is positioned such that the bucket second sidewall bottom edge is flush with the bucket base top surface. In an embodiment, a bucket second sidewall width, extending along the first axis, may exceed a bucket second sidewall length, extending along the second axis. Moreover, the bucket second sidewall length may exceed the bucket second sidewall width.

The bucket second sidewall bottom edge and/or the bucket second sidewall top edge may be disposed between the bucket second sidewall inner surface and the bucket second sidewall outer surface. In a further embodiment, the bucket second sidewall top edge may be disposed between a bucket second sidewall inner surface top edge and a bucket second sidewall outer surface top edge, and the bucket second sidewall bottom edge may be disposed between a bucket second sidewall inner surface bottom edge and a bucket second sidewall outer surface bottom edge.

The bucket first sidewall 330, the bucket second sidewall 340, the bucket front wall 310, and the bucket back wall 320 may define a uniform bucket sidewall. In an embodiment, the bucket first sidewall inner surface, the bucket second sidewall inner surface, the bucket front wall inner surface, and the bucket back wall inner surface may define a uniform bucket sidewall inner surface. In another embodiment, a bucket storage area may be defined by the uniform bucket sidewall inner surface and the bucket base top surface.

The bucket storage area may be configured to house at least one the utensil block 130. In another embodiment, the bucket 120 may be configured to accept the utensil block 130 and/or the knife block 140. In another embodiment, the bucket storage area may be configured to house the at least one culinary implement. In a further embodiment, the bucket storage area may be configured to house a combination of the tray, the utensil block 130, the knife block 140, and/or the at least one culinary implement. In an embodiment, the bucket 120 includes a foot disposed on the bottom surface of the bucket. The foot may traverse the entirety of the bottom surface of the bucket. However, in another embodiment, the foot may traverse a portion of the bottom surface of the bucket 120, such that a perimeter of the bottom surface of the bucket 120 may be exposed. Accordingly, in such an embodiment, the foot may promote adherence of the bucket 120 to its receiving surface, such as the tray 110. The foot may be of a rubber material or any other material suitable to promote reversible adherence between the bucket 120 and a receiving surface. In another embodiment, the bottom surface of the bucket 120 may be smooth, composed of a frictionless material, and/or coated with a frictionless material, such that the bucket 120 may slide along the tray base top surface 250.

Figure 4:
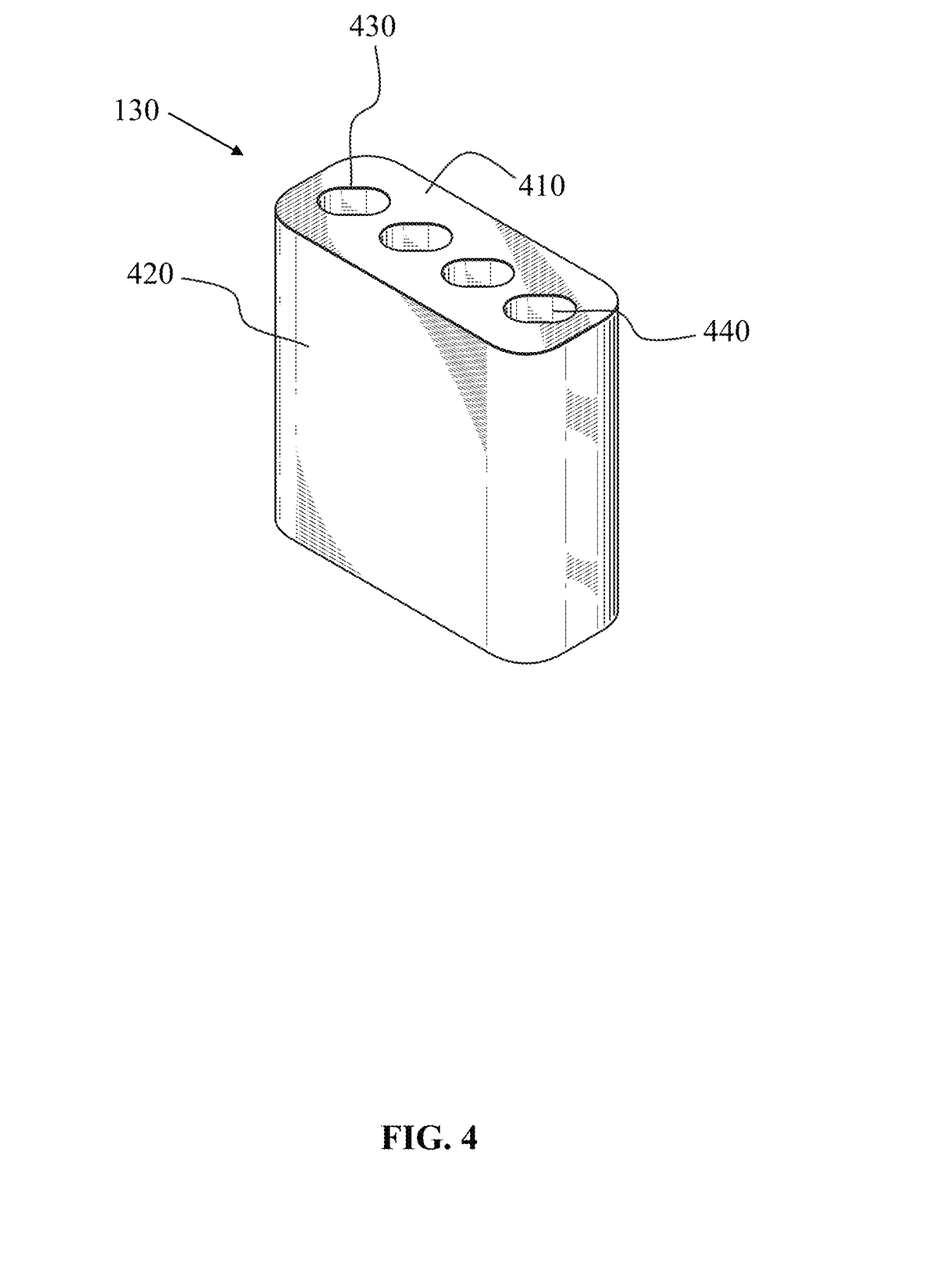
FIG. 4 is an illustration of an embodiment of the utensil block.

Referring to FIG. 4, the plurality of components, comprising the storage system, may further include the utensil block 130, wherein the utensil block 130 may be comprised of a utensil block top surface 410, a utensil block bottom surface, and/or a utensil block encasing 420. The utensil block 130 may be comprised of a utensil block material, wherein said material may include at least one of ceramic, glass, metal, plastic, and wood. In an embodiment, the utensil block 130 may be comprised of one or more of the aforementioned utensil block materials.

Figure 8:
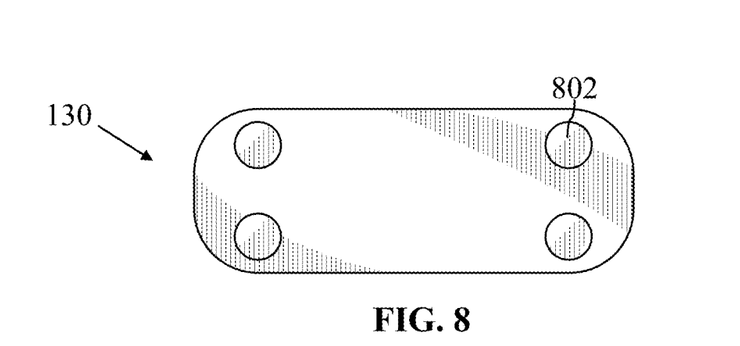
FIG. 8 is an illustration of an embodiment the bottom surface of the utensil block.

In an embodiment, the utensil block top surface 410 and/or the utensil block bottom surface may employ one or more magnets 802, such that said surfaces are able to reversibly adhere to at least one of the utensil bucket top surface and the tray base top surface 250. In an embodiment, ferrous material may be disposed within the utensil block top surface 410 and/or the utensil block bottom surface, such that said surfaces are able to reversibly adhere to at least one of the utensil bucket top surface and the tray base top surface 250.

The utensil block top surface 410 may be configured into a utensil block top surface shape, wherein the utensil block top surface shape is at least one of a rectangle, a square, an ellipse, a circle, and a chamfered rectangle. However, the utensil block top surface shape may be comprised of any suitable shape alternative. In an embodiment, the utensil block top surface 410 may be placed into the bucket storage area and/or the tray storage area.

The utensil block top surface 410 may include a plurality of utensil block top surface apertures 430. The plurality of utensil block top surface apertures 430 may be configured into a utensil block top surface aperture shape, wherein said shape may be comprised of at least one of a rectangle, a square, an ellipse, a circle, and a chamfered rectangle. The one or more apertures 430 may be configured to accept one or more utensils.

The utensil block bottom surface may be configured into a utensil block bottom surface shape, wherein the utensil block bottom surface shape is at least one of a rectangle, a square, an ellipse, a circle, and a chamfered rectangle. However, the utensil block bottom surface shape may be comprised of any suitable shape alternative. In an embodiment, the utensil block bottom surface may be placed into the bucket storage area and/or the tray storage area.

The utensil block bottom surface may include a plurality of utensil block bottom surface apertures (not shown). The plurality of utensil block bottom surface apertures may be configured into a utensil block bottom surface aperture shape, wherein said shape may be comprised of at least one of a rectangle, a square, an ellipse, a circle, and a chamfered rectangle. In an embodiment, the bottom surface apertures may be in fluid communication with the top surface apertures 430, such that water or other debris may enter the top surface aperture 430 and exit the bottom surface apertures. Accordingly, the bottom surface apertures may prevent mold or other buildup within the utensil block 130. In an embodiment where the utensil block 130 is accepted by the bucket 120, the bucket 120 may collect water or debris that has traversed the top surface apertures 430 to the bottom surface apertures. Accordingly, a user may simply empty the water or debris from the bucket 120.

In an embodiment, the utensil block top surface shape may differ from the utensil block bottom surface shape. In another embodiment, the utensil block top surface shape may be the same as the utensil block bottom surface shape.

The utensil block encasing 420 may be disposed between the utensil block top surface 410 and the utensil block bottom surface. In an embodiment, the utensil block encasing 420 includes a plurality of utensil block storage compartments 440. The plurality of utensil block storage compartments 440 may be disposed within a utensil block encasing interior portion. Furthermore, the plurality of utensil block storage compartments 440 may be perpendicular to the utensil block top surface 410 and/or the utensil block bottom surface. In another embodiment, the plurality of utensil block storage compartments 440 may not be perpendicular to the utensil block top surface 410 and/or the utensil block bottom surface.

In an embodiment, the plurality of utensil block storage compartments 440 may connect to the plurality of utensil block top surface apertures 430. In the aforementioned embodiment, a portion of the at least one culinary implement may be received by the plurality of utensil block top surface apertures 430, allowing for the portion of the at least one culinary implement to be housed in the plurality of utensil block storage compartments. In a further embodiment, the plurality of utensil block storage compartments 440 may connect to the plurality of utensil block bottom surface apertures. In the same embodiment, the portion of the at least one culinary implement may be received by the plurality of utensil block bottom surface apertures, allowing for the portion of the at least one culinary implement to be housed in the plurality of utensil block storage compartments. In yet a further embodiment, the plurality of utensil block storage compartments 440 may connect the plurality of utensil block top surface apertures 430 to the plurality of utensil block bottom surface apertures, wherein the connection of the utensil block top surface apertures 430 to the utensil block bottom surface apertures via the utensil block storage compartments 440 form a unified hollow tube. In the above embodiment, the portion of the at least one culinary implement may be received by the utensil block top surface apertures 430 and/or the utensil block bottom surface apertures, allowing for the portion of the at least one culinary implement to be housed within the unified hollow tube.

In an embodiment, the utensil block top surface apertures 430 and accompanying compartments may be oblong, such that the utensil block top surface apertures 430 and accompanying compartments 440 are sized to accept the handle portions of cooking implements. As shown in FIG. 4, each of the utensil block top surface apertures 430 and accompanying compartments 440 are equally spaced apart. The utensil block top surface apertures 430 and accompanying compartments 440 may be disposed or offset at roughly 45 degrees to the axis of any one of the walls of the utensil block 130. Accordingly, the offset utensil block top surface apertures 430 and accompanying compartments 440 may provide adequate real estate above the utensil block 130 for the distal portions of utensils, such that the distal portions of the utensils do not interfere with adjacent utensils.

Figure 10:
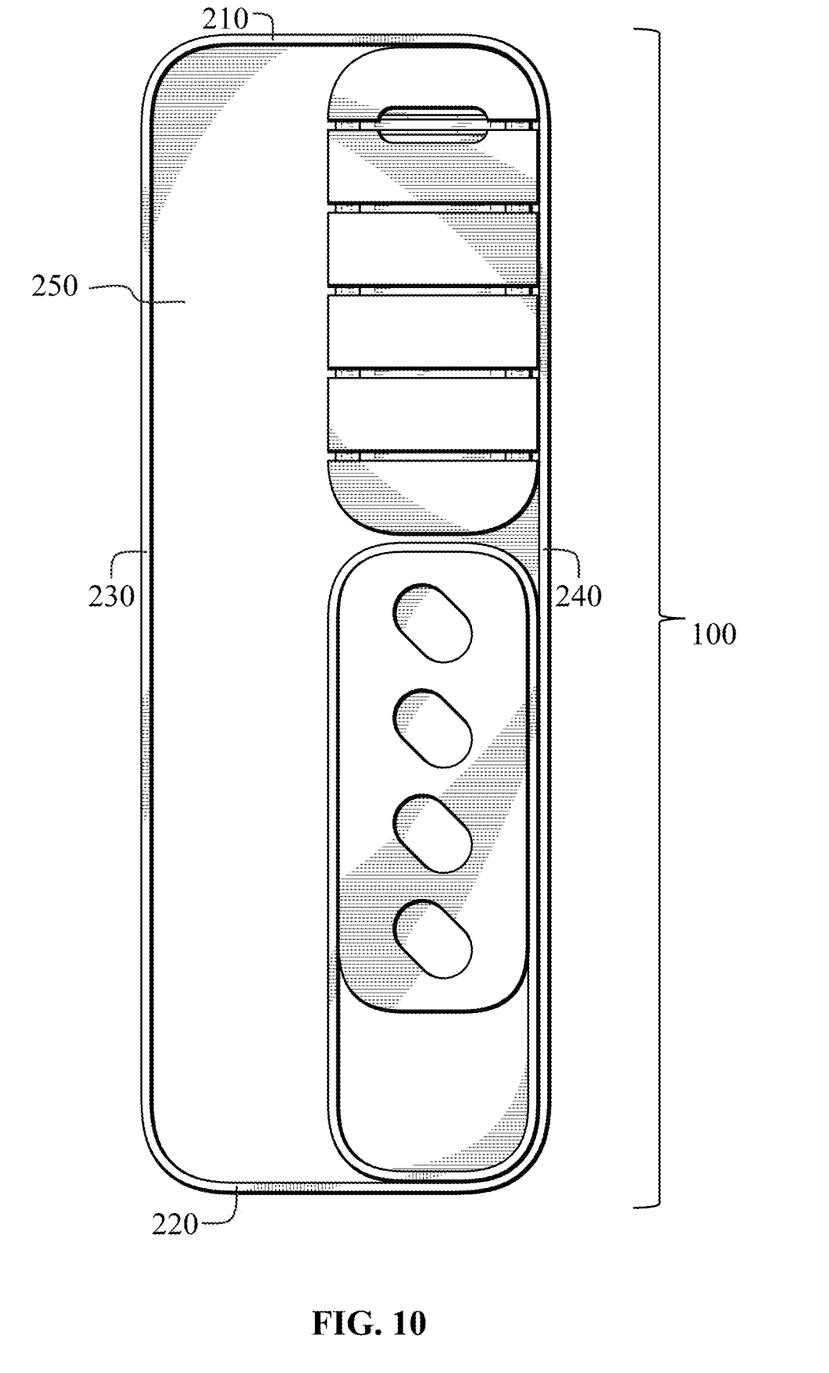
FIG. 10 is an illustration of an embodiment of the culinary implement storage system, wherein the utensil block is in a first configuration.
Figure 11:
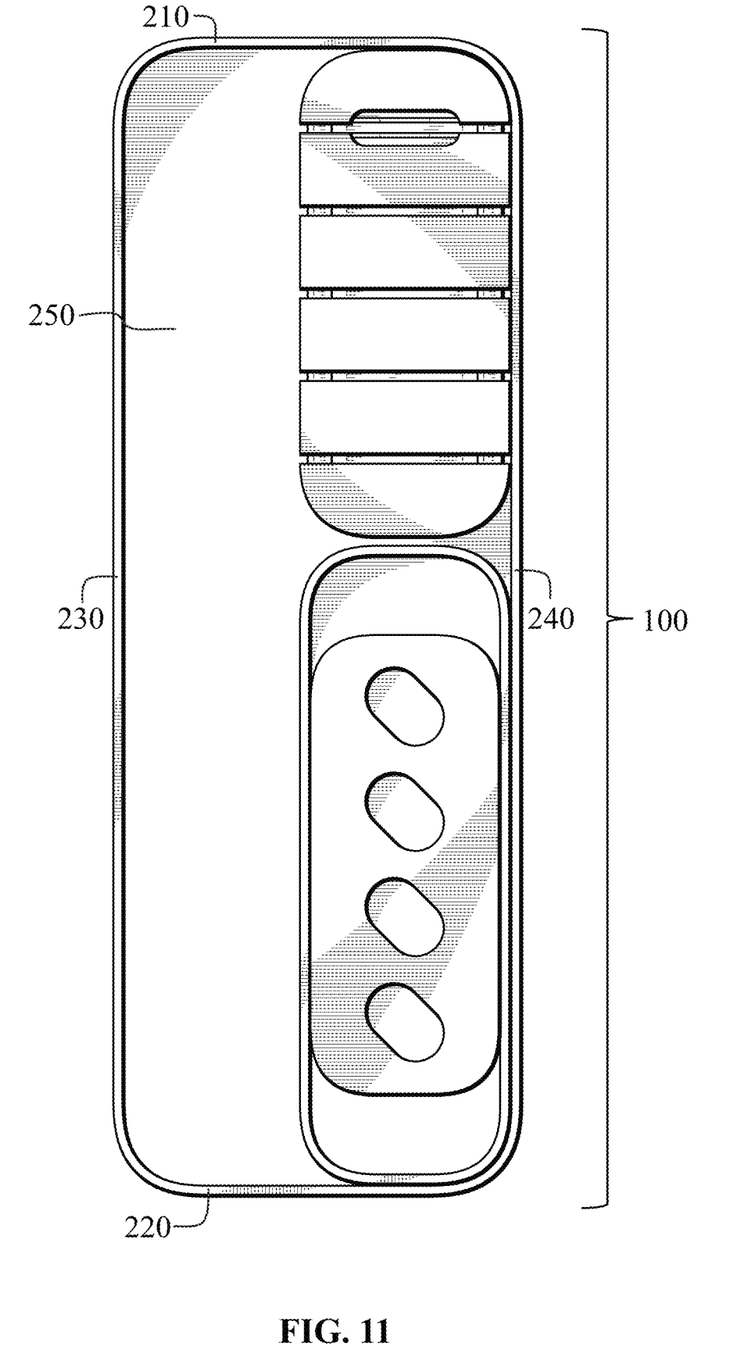
FIG. 11 is an illustration of an embodiment of the culinary implement storage system, wherein the utensil block is in a second configuration.

The utensil block 130 or components thereof (e.g., the utensil block encasing 420) may shaped and/or sized accordingly to the inner surface of the bucket 120, such that the utensil block 130 may interface with at least one of the walls of the bucket 120. In an embodiment, the utensil block 130 and the bucket 120 may be configured such that up to three of the sidewalls of the utensil block 130 may interface with the bucket 120, as shown in FIG. 2A. As non-limiting examples, the utensil block 130 may interface with: (1) the bucket front wall 310, the bucket second sidewall 340, and the bucket first sidewall 330, as shown in FIG. 10; (2) the bucket first sidewall 330 and the bucket second sidewall 340, as shown in FIG. 11; and/or (3) the bucket first sidewall 330, the bucket back wall 320, and the bucket second sidewall 340, as show in FIG. 2A. Accordingly, the utensil block 130 may be slid within the bucket 120 to convert the utensil block 130 between any of the aforementioned configurations. In any of the aforementioned embodiments, one or more utensils or other objects may be disposed in the space formed between the bucket 120 and the utensil block 130.

Figure 5:
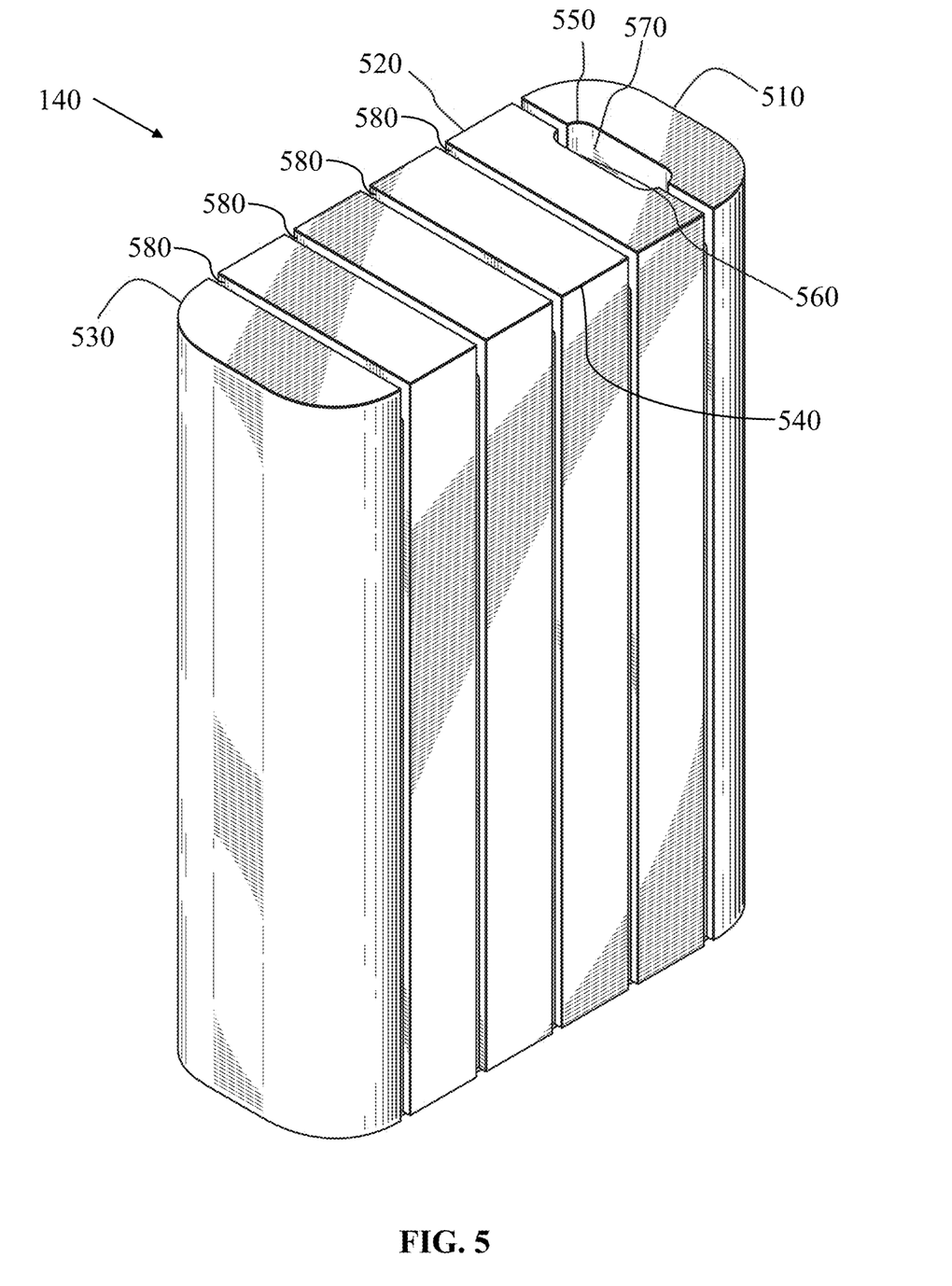
FIG. 5 is an illustration of an embodiment of the knife block

Referring to FIG. 5, the plurality of components, comprising the storage system, may further include the knife block 140, wherein the knife block 140 may be comprised of a first front end member 510, a second front end member 520, a back-end member 530, a plurality of elongated members 540, and a plurality of dividers. The knife block 140 may be comprised of a knife block material, wherein said material may include at least one of ceramic, glass, metal, plastic, and wood. In an embodiment, the knife block 140 may be comprised of one or more of the aforementioned knife block materials.

The first front end member 510 may be comprised of a first front end member top surface, a first front end member bottom surface, a first front end member outer wall, and/or a first front end member inner wall.

The first front end member top surface may be configured into a first front end member top surface shape, wherein the shape is at least one of a rectangle, a square, a half ellipse, a half circle, a trapezoid, and half of a chamfered rectangle. However, the first front end member top surface shape may be comprised of any suitable shape alternative.

The first front end member bottom surface may be configured into a first front end member bottom surface shape, wherein the shape is at least one of a rectangle, a square, a half ellipse, a half circle, a trapezoid, and half of a chamfered rectangle. However, the first front end member bottom surface shape may be comprised of any suitable shape alternative.

In an embodiment, the first front end member top surface shape and the first front end member bottom surface shape may be the same. In another embodiment, the first front end member top surface shape and the first front end member bottom surface shape may be different.

The first front end member top surface may further comprise a first front end member top surface notch 550. In an embodiment, the first front end member top surface notch 550 is disposed on a top edge of the first front end member inner wall. In another embodiment, the first front end member top surface notch 550 may extend down a portion of the first front end member inner wall defining a first front end member indentation, wherein the indentation is perpendicular to the first front end member top surface. Additionally, the first front end member indentation may not be perpendicular to the first front end member top surface.

The second front end member 520 may be comprised of a second front end member top surface, a second front end member bottom surface, a second front end member first inner wall, a second front end member second inner wall, a second front end member first outer wall, and/or a second front end member second outer wall.

The second front end member top surface may be configured into a second front end member top surface shape, wherein the shape is at least one of a chamfered rectangle, a rectangle, and a square. However, the second front end member top surface shape may be comprised of any suitable shape alternative.

The second front end member bottom surface may be configured into a second front end member bottom surface shape, wherein the shape is at least one of a chamfered rectangle, a rectangle, and a square. However, the second front end member bottom surface shape may be comprised of any suitable shape alternative.

In an embodiment, the second front end member top surface shape and the second front end member bottom surface shape may be the same. In another embodiment, the second front end member top surface shape and the second front end member bottom surface shape may differ.

The second front end member top surface may further comprise a second front end member top surface notch 560. In an embodiment, the second front end member top surface notch 560 is disposed on a top edge of the second front end member first inner wall. In a different embodiment, the second front end member top surface notch 560 may be disposed on a top edge of the second front end member second inner wall. In a further embodiment, the second front end member top surface notch 560 may extend down a portion of the second front end member first inner wall and/or the second front end member second inner wall defining a second front end member indentation, wherein the indentation is perpendicular to the second front end member top surface. Moreover, the second front end member indentation may not be perpendicular to the second front end member top surface.

The first front end member top surface notch 550 and the second front end member top surface notch 560 may define a front-end aperture 570. In an embodiment, the front-end aperture 570 may be capable of receiving at least one culinary implement.

The first front end member indentation and the second front end member indentation may define a front-end member receptacle, wherein said receptacle may be capable of housing the at least one culinary implement.

The back-end member 530 may be comprised of a back-end member top surface, a back-end member bottom surface, a back-end member outer wall, and/or a back-end member inner wall.

The back-end member top surface may be configured into a back-end member top surface shape, wherein the shape is at least one of a rectangle, a square, a half ellipse, a half circle, a trapezoid, and half of a chamfered rectangle. However, the back-end member top surface shape may be comprised of any suitable shape alternative.

The back-end member bottom surface may be configured into a back-end member bottom surface shape, wherein the shape is at least one of a rectangle, a square, a half ellipse, a half circle, a trapezoid, and half of a chamfered rectangle. However, the back-end member bottom surface shape may be comprised of any suitable shape alternative.

In an embodiment, the back-end member top surface shape and the back-end member bottom surface shape may be the same. In another embodiment, the back-end member top surface shape and the back-end member bottom surface shape may differ.

The plurality of elongated members 540 may be comprised of an elongated member top surface, an elongated member bottom surface, an elongated member first inner wall, an elongated member second inner wall, an elongated member first outer wall, and/or an elongated member second outer wall.

The elongated member top surface may be configured into an elongated member top surface shape, wherein the shape is at least one of a rectangle, a square, and a chamfered rectangle. However, the elongated member top surface shape may be comprised of any suitable shape alternative.

The elongated member bottom surface may be configured into an elongated member bottom surface shape, wherein the shape is at least one of a rectangle, a square, and a chamfered rectangle. However, the elongated member bottom surface shape may be comprised of any suitable shape alternative.

In an embodiment, the elongated member top surface shape and the elongated member bottom surface shape may be the same. In another embodiment, the elongated member top surface shape and the elongated member bottom surface shape may be different.

Figure 7:
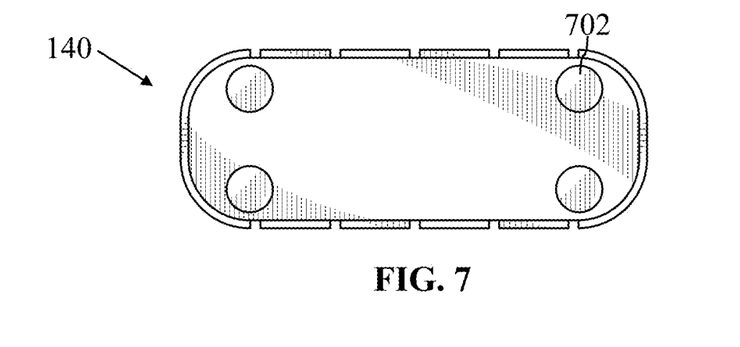
FIG. 7 is an illustration of an embodiment of the bottom surface of the knife block.

The first front end member bottom surface, the second front end member bottom surface, the back end member bottom surface, and the elongated member bottom surface may form a knife block bottom surface. In an embodiment, the knife block bottom surface may employ one or magnets 702, such that the knife block bottom surface is able to reversibly adhere to at least one of the utensil bucket top surface and the tray base top surface 250. In a further embodiment, ferrous material may be disposed within the knife block bottom surface, such that said surface is able to reversibly adhere to at least one of the utensil bucket top surface and the tray base top surface 250.

Figure 6:
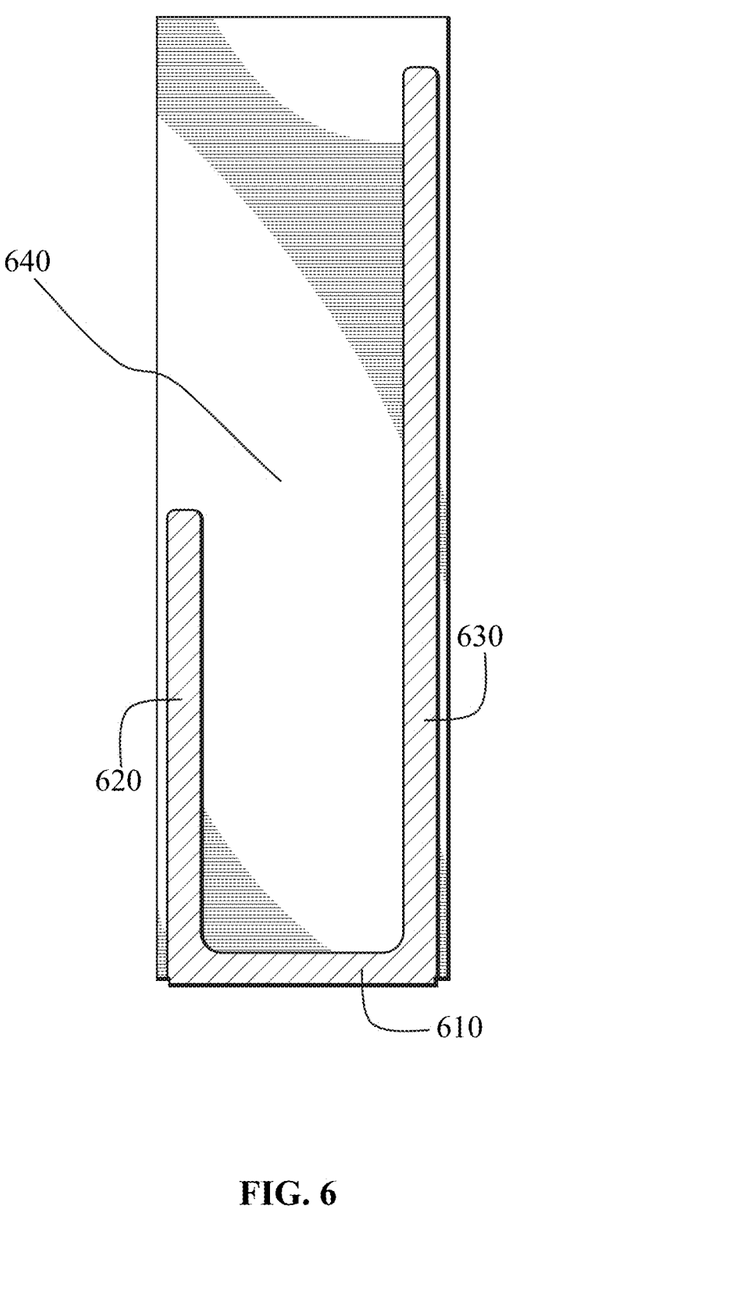
FIG. 6 is an illustration of an embodiment of the knife block and the plurality of dividers thereof.

Referring to FIG. 6, the plurality of dividers may be comprised of a divider base 610, a divider front wall 620, and/or a divider back wall 630. In an embodiment the plurality of dividers may be disposed on the first front end member inner wall, the second front end member first inner wall, the second front end member second inner wall, the elongated member first inner wall, the elongated member second inner wall, and/or the back-end member inner wall (hereinafter collectively referred to as the "inner walls").

In an embodiment, the plurality of dividers may attach the first front end member 510 to the second front end member 520. In another embodiment, the plurality of dividers may attach to the plurality of elongated members 540. In a different embodiment, the plurality of dividers may attach the back-end member 530 to the plurality of elongated members 540. In a further embodiment, the plurality of dividers may attach the back-end member 530 to at least one of the first front end member 510 and the second front end member 520. In yet a further embodiment, the plurality of dividers may employ any combination of the aforementioned embodiments.

The divider base 610 may be comprised of a divider base inner edge and/or a divider base outer edge. In an embodiment, the divider base 610, having a divider base length, may be disposed along a bottom edge of the inner walls. In an embodiment, the divider base length may be equal to a length of the bottom edge of the inner walls. In another embodiment, the divider base length may be less than the length of the bottom edge of the inner walls. The divider base outer edge may be arranged such that said outer edge is flush with the bottom edge of the inner walls. In a different embodiment, the divider base outer edge may be arranged such that said outer edge is not flush with the bottom edge of the inner walls.

The divider front wall 620 may be comprised of a divider front wall inner edge and/or a divider front wall outer edge. Said divider front wall 620 may be disposed on a first outer edge or a second outer edge of the inner walls. The divider front wall 620 may have a divider front wall length. In an embodiment, the divider front wall length is equal to a length of the first outer edge or the second outer edge of the inner walls. In another embodiment, the divider front wall length is less than the length of the first outer edge or the second outer edge of the inner walls. The divider front wall outer edge may be arranged such that the divider front wall outer edge may be flush the first outer edge or the second outer edge of the inner walls. In yet a further embodiment, the divider front wall outer edge may not be flush with the first outer edge or the second outer edge of the inner walls.

The divider back wall 630 may be comprised of a divider back wall inner edge and/or a divider back wall outer edge. The divider back wall 630 may be disposed on the first outer edge or the second outer edge of the inner walls. The divider back wall 630 may have a divider back wall length. In an embodiment, the divider back wall length is equal to the length of the first outer edge or the second outer edge of the inner walls. In another embodiment, the divider back wall length is less than the length the first outer edge or the second outer edge of the inner walls. The divider back wall outer edge may be arranged such that said outer edge is flush with the first outer edge or the second outer edge of the inner walls. In a further embodiment, the divider back wall outer edge is not flush with the first outer edge or the second outer edge of the inner walls.

In an embodiment, the divider front wall length may equal the divider back wall length. In a further embodiment, the divider front wall length may exceed the divider back wall length. In yet a further embodiment, the divider back wall length may exceed the divider front wall length. In another embodiment, the divider front wall length may be between one-quarter and three-quarters of the divider back wall length. In a different embodiment, the divider back wall length may be between one-quarter and three-quarters of the divider front wall length.

In an embodiment, the knife block 140 is further comprised of a plurality of knife block compartments 640. In an embodiment, the divider base inner edge, the divider front wall inner edge, the divider back wall inner edge, and at least two of the inner walls define the plurality of knife block compartments 640. Moreover, the plurality of knife block compartments 640 may be further defined by a space created between the inner walls resulting from the disposition of the plurality of dividers between said walls. The plurality of knife block compartments 640 may be configured to house the at least one culinary implement. In another embodiment, the plurality of knife block compartments 640 may be further comprised of at least one knife block compartment opening 580, wherein said opening 580 is defined by the space between a top edge of the inner walls. Furthermore, said opening 580 may be configured to receive the at least one culinary implement. In a different embodiment, the at least one knife block compartment opening 580 may be further defined by the divider front wall 620, wherein the divider front wall length is less than the length of the first outer edge or the second outer edge of the inner walls. Additionally, the at least one knife block compartment opening 580 may be configured to receive a cutting portion of a knife, such that the cutting portion is housed in at least one of the plurality of knife block compartments 640. Moreover, said housing of the cutting portion may leave enough real estate above the knife block 140 for a knife handle, such that said handles do not interfere with one another when housed in the plurality of knife block compartments 640.

In an embodiment, the divider front wall 620 may be shorter than the divider back wall 630 such that a knife may be retrieved from the knife block compartment 640 with ease. As a non-limiting example, the divider front wall 620 may face a user, wherein the user may extract a knife from the knife block compartment 640, and wherein the height of the divider front wall 620 permits the knife to pivot toward the user as the knife exits the knife block compartment 640. In a further embodiment, magnets may be disposed in the knife block compartment 640, the divider front wall 620, the divider back wall 630, the divider base 610, and/or any suitable component adjacent to the knife block compartment 640. Such magnets may reversibly adhere the incident knife to the knife block compartment 640.

The at least one culinary implement may include at least one of a boning knife, a chef's knife, a cleaver, a filet knife, a paring knife, a santoku knife, a serrated knife, one or more wooden spoons, a whisk, a tongs, a spatula, a ladle, a pizza cutter, a peeler, a potato masher, a can opener, an ice cream spoon, a pasta spoon, and/or a pair of shears.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A modular culinary storage system comprising:
   a tray;
   a utensil bucket;
   a utensil block comprising:
      a utensil block top surface comprising a plurality of utensil block top surface apertures, and
      a plurality of utensil block storage compartments, each of the plurality of utensil block storage compartments bound by at least one of the plurality of utensil block top surface apertures; and
   a knife block comprising:
      a first front end member comprising a first front end member top surface notch;
      a second front end member, comprising a second front end member top surface notch,
         the first front end member top surface notch and the second front end member top surface notch defining a front end aperture;
      a plurality of elongated members;
      a back-end member; and
      a plurality of dividers disposed between at least one of the first front end member, the second front end member, the plurality of elongated members, and the back-end member;
   the tray, configured to house at least one of the utensil bucket, the utensil block, and the knife block; and
   the utensil bucket, configured to house at least one of the utensil block and the knife block.

2. The modular culinary storage system of claim 1, wherein the utensil bucket further comprises one or more magnetic utensil bucket members.

3. The modular culinary storage system of claim 1, wherein the utensil block further comprises one or more magnetic utensil block members.

4. The modular culinary storage system of claim 1, wherein the knife block further comprises one or more magnetic knife block members.

5. The modular culinary storage system of claim 1, wherein each of the plurality of dividers comprise:
   a divider base;
   a divider front wall orthogonal to the divider base; and
   a divider back wall orthogonal to the divider base.

6. The modular culinary storage system of claim 5, wherein the divider front wall is shorter than the divider back wall.

7. The modular culinary storage system of claim 1, the utensil block further comprising a plurality of utensil block storage compartments, each of the plurality of utensil block storage compartments bound by one of a utensil block bottom surface apertures and one of the utensil block top surface apertures.

8. The modular culinary storage system of claim 1, wherein the tray further comprises a foot not traversing an entirety of the tray.

9. The modular culinary storage system of claim 1, wherein the plurality of dividers define a plurality of knife block compartments.

10. The modular culinary storage system of claim 9, wherein each of the plurality of knife block compartments further comprises at least one knife block compartment opening, wherein each of the at least one knife block compartment openings is of a lesser area than the front end aperture.

11. The modular culinary storage system of claim 10, wherein the utensil bucket is sized to accept the utensil block, and wherein the utensil block is configurable in a plurality of configurations within utensil bucket.

12. The modular culinary storage system of claim 11, wherein the plurality of configurations comprises a first configuration and a second configuration, wherein the utensil bucket comprises a bucket front wall, a bucket back wall, a bucket first sidewall, and a bucket second sidewall, wherein, in the first configuration, the utensil block interfaces only with the bucket first sidewall, the bucket front wall, and the bucket second sidewall, and wherein, in the second configuration, the utensil block interfaces only with the bucket first sidewall, and the bucket second sidewall.

13. The modular culinary storage system of claim 12, wherein the plurality of configurations further comprises a third configuration, and wherein, in the third configuration, the utensil block interfaces only with the bucket back wall, the bucket first sidewall and the bucket second sidewall.

14. The modular culinary storage system of claim 1, wherein each of the plurality of utensil block top surface apertures is oblong, wherein the utensil bucket comprises a utensil bucket sidewall, and wherein each of the plurality of utensil block top surface apertures are disposed nonorthogonal to the utensil bucket sidewall.

15. The modular culinary storage system of claim 14, wherein the utensil block comprises a utensil block side wall, and wherein the utensil bucket sidewall and the utensil block sidewall comprise complementary curvature.

* * * * *